(12) United States Patent
Mukherjee et al.

(10) Patent No.: US 11,576,063 B2
(45) Date of Patent: Feb. 7, 2023

(54) METHODS FOR OBTAINING CELL STATUS INFORMATION FROM A CELL SITE AGGREGATION FRONTHAUL ROUTER

(71) Applicant: Cisco Technology, Inc., San Jose, CA (US)

(72) Inventors: Sounak Mukherjee, Bangalore (IN); S Sachin Kumar, Bangalore (IN); Muhammad Waris Sagheer, San Ramon, CA (US); Daniel Lucas Clark, Victoria (AU)

(73) Assignee: CISCO TECHNOLOGY, INC., San Jose, CA (US)

( * ) Notice: Subject to any disclaimer, the term of this patent is extended or adjusted under 35 U.S.C. 154(b) by 109 days.

(21) Appl. No.: 17/240,261

(22) Filed: Apr. 26, 2021

(65) Prior Publication Data
US 2022/0345915 A1  Oct. 27, 2022

(51) Int. Cl.
*H04W 24/08* (2009.01)
*H04L 45/50* (2022.01)

(52) U.S. Cl.
CPC ............ *H04W 24/08* (2013.01); *H04L 45/50* (2013.01)

(58) Field of Classification Search
None
See application file for complete search history.

(56) References Cited

U.S. PATENT DOCUMENTS

| 2018/0070246 | A1 | 3/2018 | Jack et al. |
| 2019/0007246 | A1 | 1/2019 | Fertonani et al. |
| 2019/0245740 | A1 | 8/2019 | Kachhla |
| 2020/0235788 | A1 | 7/2020 | Rajagopal et al. |

FOREIGN PATENT DOCUMENTS

WO   2020058772 A1   3/2020

*Primary Examiner* — Saad Khawar
(74) *Attorney, Agent, or Firm* — Edell, Shapiro & Finnan, LLC

(57) ABSTRACT

A method is provided for a radio aware transport network. A network device obtains a first request for a status of one or more radio cells of a radio access network. The network device is configured to transmit radio traffic of the radio access network in a fronthaul packet network and is in communication with a radio controller that manages the one or more radio cells. The network device provides, to the radio controller, a second request for operational data related to the one or more radio cells. The second request is in a format specific to the radio controller. The network device obtains, from the radio controller, the operational data and determining the status of the one or more radio cells based on the operational data.

20 Claims, 7 Drawing Sheets

METHODS FOR OBTAINING CELL STATUS INFORMATION FROM A CELL SITE AGGREGATION FRONTHAUL ROUTER

TECHNICAL FIELD

The present disclosure generally relates to networks, and more particularly, to network equipment and services.

BACKGROUND

Networking architectures have grown increasingly complex in communication environments. In particular, access network configurations for mobile network architectures have become more complex, multilayered, and use various protocols. One recent development is a Cloud- (or Centralized) Radio Access Network (C-RAN) with a packet-based fronthaul, which packetizes digital radio information and transports the packets over the Internet Protocol (IP)/Ethernet network. There are many challenges in operations, administration, maintenance, provisioning, and troubleshooting (OAMPT) of these radio networks with packet-based fronthaul sections.

DESCRIPTION OF EXAMPLE EMBODIMENTS

Overview

Figure 1:
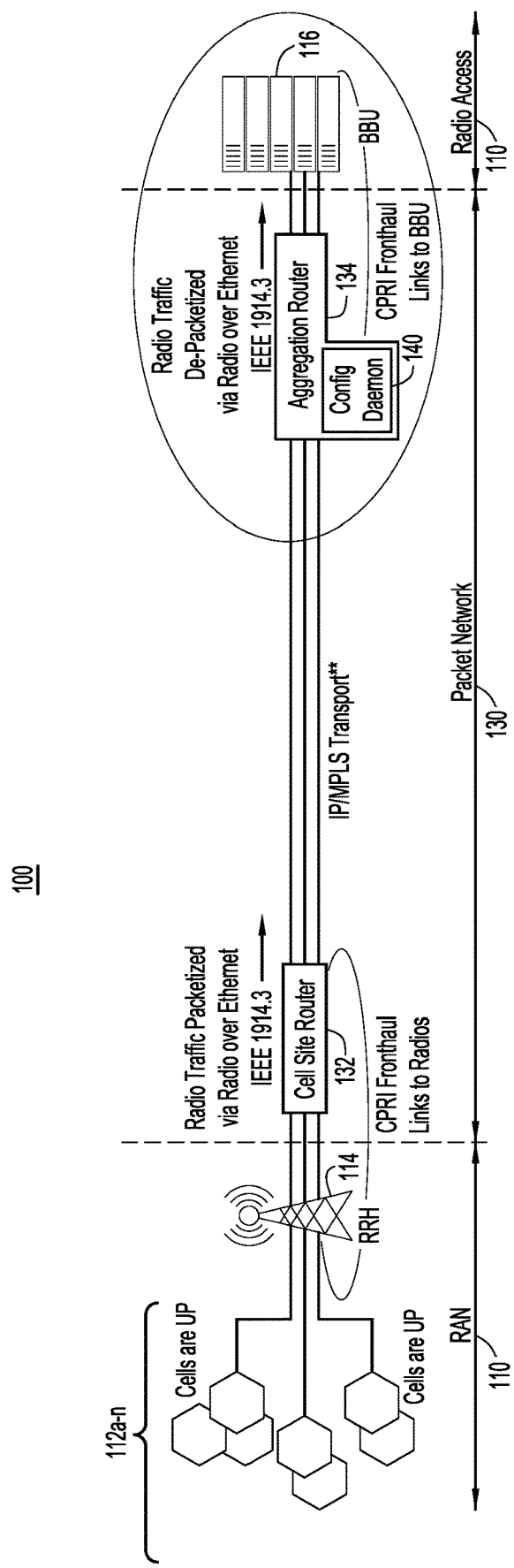
FIG. 1 is a block diagram of a system depicting a centralized radio access network with a packet-based fronthaul that includes an aggregation router that hosts one or more applications that interact with a radio controller for a cell status, according to one example embodiment.

Briefly, a methods, apparatus, and a system are configured to provide a radio aware transport and provide one or more services to diagnose problems with a packetized fronthaul (Radio over Ethernet (RoE) and Common Public Radio Interface (CPRI)) when a cell is disabled.

The method includes a network device obtaining a first request for a status of one or more radio cells of a radio access network. The network device is configured to transmit radio traffic of the radio access network in a fronthaul packet network and is in communication with a radio controller that manages the one or more radio cells. The method further includes the network device providing, to the radio controller, a second request for operational data related to the one or more radio cells. The second request is in a format specific to the radio controller. The method further includes the network device obtaining, from the radio controller, the operational data and determining the status of the one or more radio cells based on the operational data.

Example Embodiments

In a typical C-RAN deployment, radio equipment (also called the radio unit (RU)), in a radio access network, is connected to a radio equipment controller (also called the baseband unit (BBU)) through a packet network that includes one or more of fronthaul cell site routers. The cell site routers, according to the definitions of Radio over Ethernet (RoE) standard specifications (Institute of Electrical and Electronics Engineering (IEEE) 1914.3), packetize the digitized radio information and transport the packet over the IP/Ethernet network. The BBU is a controller for the RU and provides the requisite information about the cells/sectors/antennas/multiple-input multiple-output (MIMO) configurations/bandwidth and so on that are associated with the corresponding RU. The radio access network and the fronthaul packet network, however, run independently of one another. These independent networks require two different OAMPT teams that have different skill sets and perform different operations specific to each of the respective network. Since these networks operate differently and independently from one another, various inefficiencies in management and troubleshooting result. There are no existing solutions that expose status of one or more RAN entities to the packet network.

Existing optical networks, mobile fronthaul solutions have no available Operations, Administration, Maintenance, Provisioning and Troubleshooting (OAMPT) capabilities in a radio access network space. The industry's existing OAMPT implementations in wireline do not extend to providing OAMPT capabilities for the C-RAN deployment with packet-based fronthaul solutions.

Techniques presented herein provide a generic solution for a radio aware packet transport. One or more applications, hosted on an entity of the packet network, interface with a radio controller to collect information about the radio access network. The radio controller collects information from the RAN nodes and provides this information to these applications. In particular, the entity of the packet network obtains status of the radio cells of the radio access network. Since information about the radio access network is available to the fronthaul packet network, the OAMPT of these two networks may be integrated (at least to some degree) using a radio aware transport analyzer (RAT-A).

Referring first to FIG. 1, a block diagram is shown of a system 100 providing C-RAN with a packet-based fronthaul solution, according to an example embodiment. The system 100 includes a radio access network (RAN) 110 and a packet network 130. The RAN 110 includes a plurality of radio cells 112*a-n*, a remote radio head (RRH) node 114, and a BBU node 116. The packet network 130 includes a cell site router 132 and an aggregation router 134. The notation "a-n" denotes that a number is not limited, can vary widely, and depends on a particular use case scenario. Additionally, while only one RRH node 114, the BBU node 116, the cell site router 132, and the aggregation router 134 are depicted in FIG. 1, the number is not limited and will depend on a particular deployment of the system 100 and the use case scenario.

In the RAN 110, the RRH node 114 provides connectivity to one or more user equipment (UE) therein (not shown) in the radio cells 112a-n. The RRH node 114 is a radio unit that may terminate any combination of a cellular and/or Wi-Fi® air interface for any combination of Radio Access Technology (RAT) types (sometimes referred to more generally as 'accesses') for the RAN 110 such as, but not limited to: 3GPP licensed spectrum accesses (e.g., 3rd Generation (3G), 4G/LTE, 5G, and/or next Generation (nG) accesses); 3GPP unlicensed spectrum accesses (e.g., Licensed-Assisted Access (LAA), enhanced LAA (eLAA), further enhanced LAA (feLAA), and New Radio Unlicensed (NR-U)); non-3GPP unlicensed spectrum accesses such as Institute of Electrical and Electronics Engineers (IEEE) 802.11 (e.g., Wi-Fi® (ID); IEEE 802.16 (e.g., WiMAX®), combinations thereof; and/or the like.

Thus, the RRH node 114 may be inclusive of any configuration/combination of 3GPP 4G/LTE evolved Node Bs (eNBs or eNodeBs), 5G next Generation NodeBs (gNBs or gNodeBs), and/or any other next Generation access nodes that may include hardware and/or software to perform baseband signal processing (such as modulation/demodulation) as well as hardware (e.g., baseband processors (modems), transmitters and receivers, transceivers, and/or the like), software, logic and/or the like to facilitate signal transmissions and signal receptions via antenna assemblies (not shown) in order to provide over-the-air Radio Frequency (RF) coverage for one or more access types (e.g., 4G/LTE, 5G, nG, CBRS, etc.) through which one or more UE, not shown, may utilize to connect to the RRH node 114 (or multiple RU nodes, not shown) for one or more sessions (e.g., voice, video, data, gaming, combinations thereof, etc.). More generally, the RRH node 114 may perform lower Physical (PHY) layer and RF operations to facilitate RF connections with one or more UE in the radio cells 112a-n. In existing 4G C-RAN systems, the RRH node 114 connects to the BBU node 116 via a direct physical link e.g., optical fiber.

The BBU node 116 is a controller for the RRH node 114. The BBU node 116 may provide lower level operations of the radio signal processing stack, such as Radio Link Control (RLC), Medium Access Control (MAC), and higher PHY layer operations, such as digital processing, including signal modulation, encoding, and scheduling, among others. The BBU node 116 reads RAN contexts from the RRH node 114 at any time and receives notifications. A RAN context is a set of variables holding a state of RAN nodes. The BBU node 116 provides RAN policies and/or instructions to the RRH node 114.

In various example embodiments, instead of the direct connection, the RRH node 114 connects to the BBU node 116 via the packet network 130. In one example, the packet network 130 includes IP/Multiprotocol Label Switching (MPLS) transport packet network.

Generally, connectivity between the RRH node 114 and the BBU node 116 may be referred to herein as "fronthaul" connectivity. It is to be understood, however, that the term fronthaul is provided for illustrative purposes only and is not meant to limit any of the broad features described herein. In some instances, fronthaul connectivity between the RRH node 114 and the BBU node 116 is facilitated via a Common Public Radio Interface (CPRI) or enhanced CPRI (eCPRI) protocols. In some instances, fronthaul CPRI/eCPRI payloads (e.g., user and/or control plane payloads) between the RRH node 114 and the BBU node 116 may be transported over Ethernet or User Datagram Protocol (UDP)/IP transports.

In FIG. 1, the fronthaul connectivity is provided by pseudo wires. That is, the RRH node 114 connects to the cell site router 132 via the CPRI fronthaul links. The cell site router 132 packetizes radio traffic received from the RRH node 114 and transmits the radio traffic via the packet network (Ethernet) to the aggregation router 134. The aggregation router 134 de-packetizes the radio traffic and provides the radio traffic to the BBU node 116 via the CPRI fronthaul links. This is just one example deployment of the packet-based mobile fronthaul network in which the BBU node 116 and the RRH node 114 maintain seamless connection over the packet network 130 and are not aware of the packet network 130 between them.

In the system 100, seamless end-to-end connectivity is obtained as follows. First, the RRH node 114 sends out digitized radio packets to the BBU node 116 via packet-based fronthaul routers (the cell site router 132 and the aggregation router 134) of the packet network 130. Next, the BBU node 116 processes the digitized radio information and sends out the processed information back to the RRH node 114 via the packet-based fronthaul routers of the packet network 130. If this scenario works as expected, the radio cells 112a-n are "unlocked" and "enabled" (UP), as would be indicated by the BBU node 116.

When problems occur with one or more of the radio cells 112a-n, these problems are not detected nor diagnosed by existing solutions. Existing solutions lack capabilities to poll the status of the radio cells 112a-n from the packet network 130. This generates a bottleneck for OAMPT in the packet based converged (wireless and wireline) Fronthaul solution. That is, the CPRI traffic from the radio packetized via Radio over Ethernet (RoE) flows end-to-end. It is simply assumed that the radio cells 112a-n are up and running. This assumption may be made based on information provided by a RAN team. There are no cell status updates in existing solutions.

On the other hand, in the system 100, the aggregation router 134 hosts a configuration daemon (Config Daemon) 140 that obtains status of the radio cells 112a-n. In one example embodiment, the Config Daemon 140 is an instance hosted in a container at the aggregation router 134. The Config Daemon 140 interrogates the BBU node 116 about one or more parameters and/or various operational statuses of the RAN 110. The Config Daemon 140 provides a level of visibility of the RAN 110 to the packet network 130. In various example embodiments, the Config Daemon 140 polls the BBU node 116 for cell status information. This is but one example and the Config Daemon 140 may poll the BBU node 116 for other OAMPT related parameters, currently known or later developed. Further, while the Config Daemon 140 is shown as being hosted by the aggregation router 134, this is but one example. The Config Daemon 140 may query the BBU node 116 from other nodes of the packet network 130 using the CPRI or another application programming interface. Config Daemon 140 is configured to obtain status of the radio cells 112a-n in the RAN 110, thereby providing a mechanism for the packet network 130 to become a radio aware transport network. Accordingly, operators that interact with the packet network 130 may now also perform at least portions of the OAMPT of the RAN 110.

Figure 2:
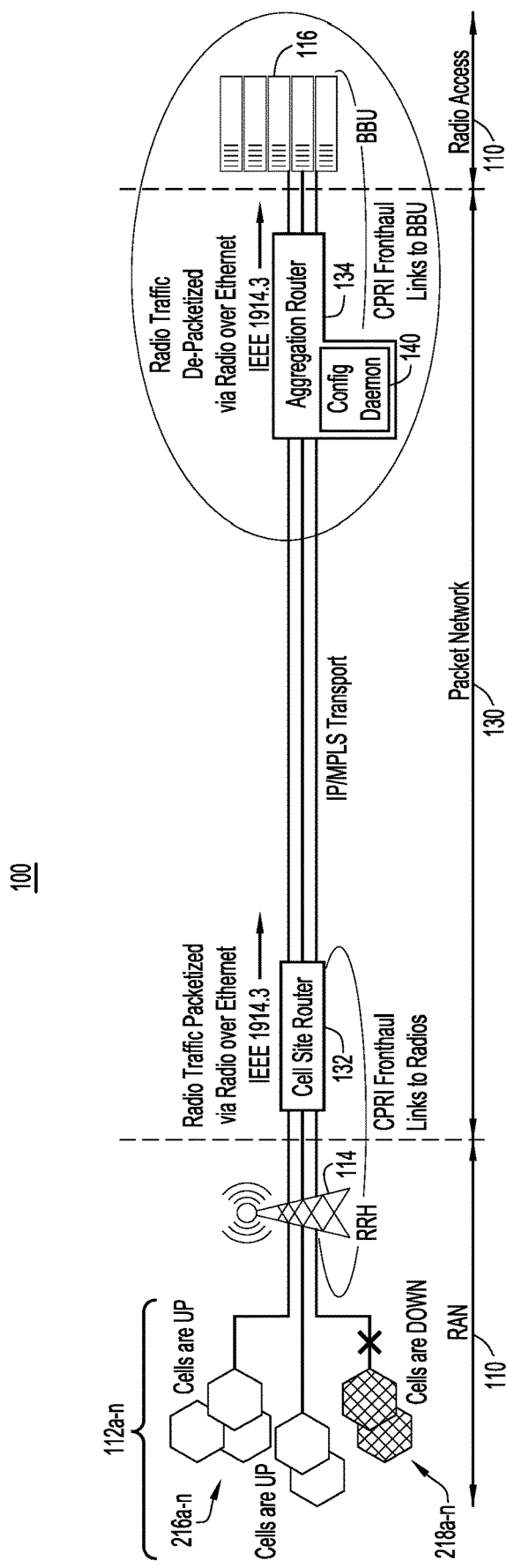
FIG. 2 is a block diagram of the system depicted in FIG. 1 in which one or more of the radio cells are down, according to one example embodiment.
Figure 3:
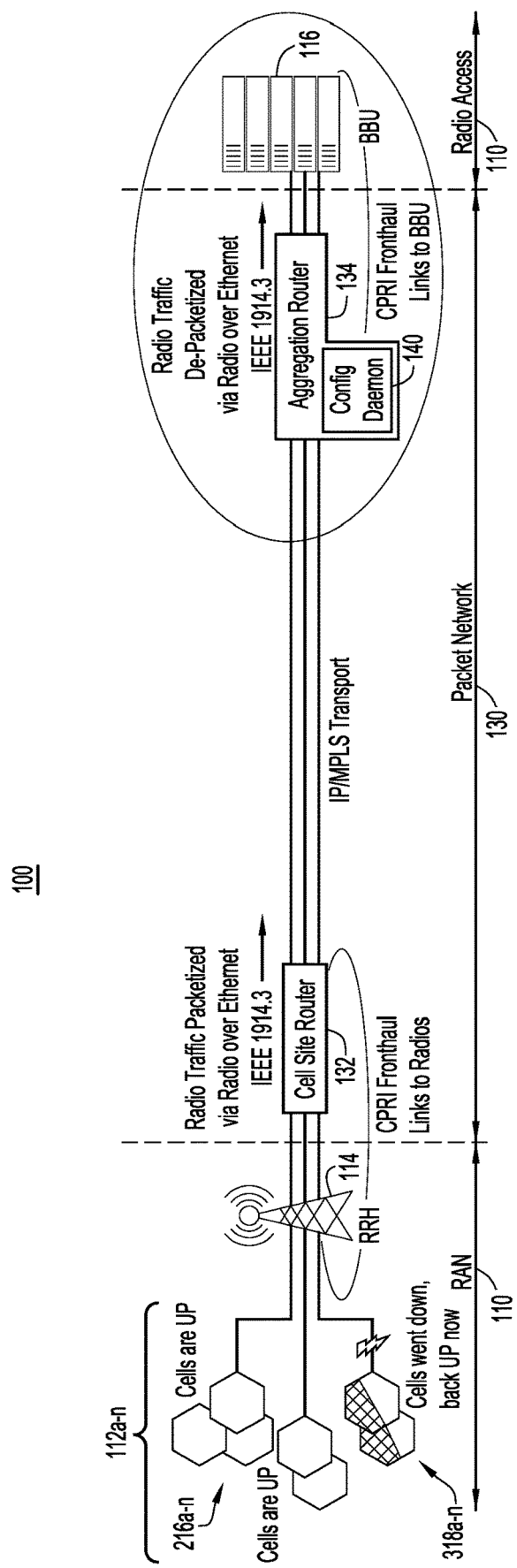
FIG. 3 is a block diagram of the system depicted in FIG. 1 in which one or more of the radio cells went down and then back up, according to one example embodiment.

FIGS. 2 and 3 are block diagrams illustrating the system 100 of FIG. 1 in which one or more of the radio cells are down, according to various example embodiments.

In FIG. 2, the radio cells 112a-n include cells 216a-n that are functioning properly and cells 218a-n that are down. Cells 218a-n served by a particular radio of the RRH node 114 have gone down. In addition, the CPRI traffic over packetized fronthaul is broken. Since no communication channel is available between the packet network 130 and the RAN 110 in existing solutions, the cell status is unknown. Further, if traffic is not received or cannot be transmitted to one of the cells 218a-n, existing solutions cannot diagnose the problem. In existing solutions, a RAN team troubleshooting the problem is unable to root the cause of the issue from BBU/RU statistics and the packet transport (RoE and CPRI both) team troubleshooting is unable to root the cause of the issue from the network statistics. In an example embodiment, however, the Config Daemon 140 determines that the status of the cells 218a-n is down and helps the packet transport team with appropriate troubleshooting.

In FIG. 3, the system 100 encounters a cell flap, according to an example embodiment. The radio cells 112a-n include cells 216a-n that are functioning properly and cells 318a-n which are cells 218a-n that were down but are now back up again. Specifically, the cells 318a-n that are served by a particular radio have gone down intermittently and are now up and running. The cells 318a-n illustrate an occurrence of a cell flop. The CPRI traffic over packetized fronthaul is now restored. Existing solutions are unable to root the cause of this intermittent issue. In other words, there is no way to determine if the issue resulted from the RAN 110 or the packet network 130 (packet transport that includes RoE and CPRI). Since the RAN team only has time stamped logs of cells going down, they do not know about the origin of the issue. Similarly, the packet transport team has statistics of packet drops but does not know where exactly the problem occurred. In one example embodiment, the Config Daemon 140 obtains the cell status information and is able to detect the cell flap. Thereby, a radio aware transport network is provided in which "Time to Act" during an outage is reduced.

Figure 4:
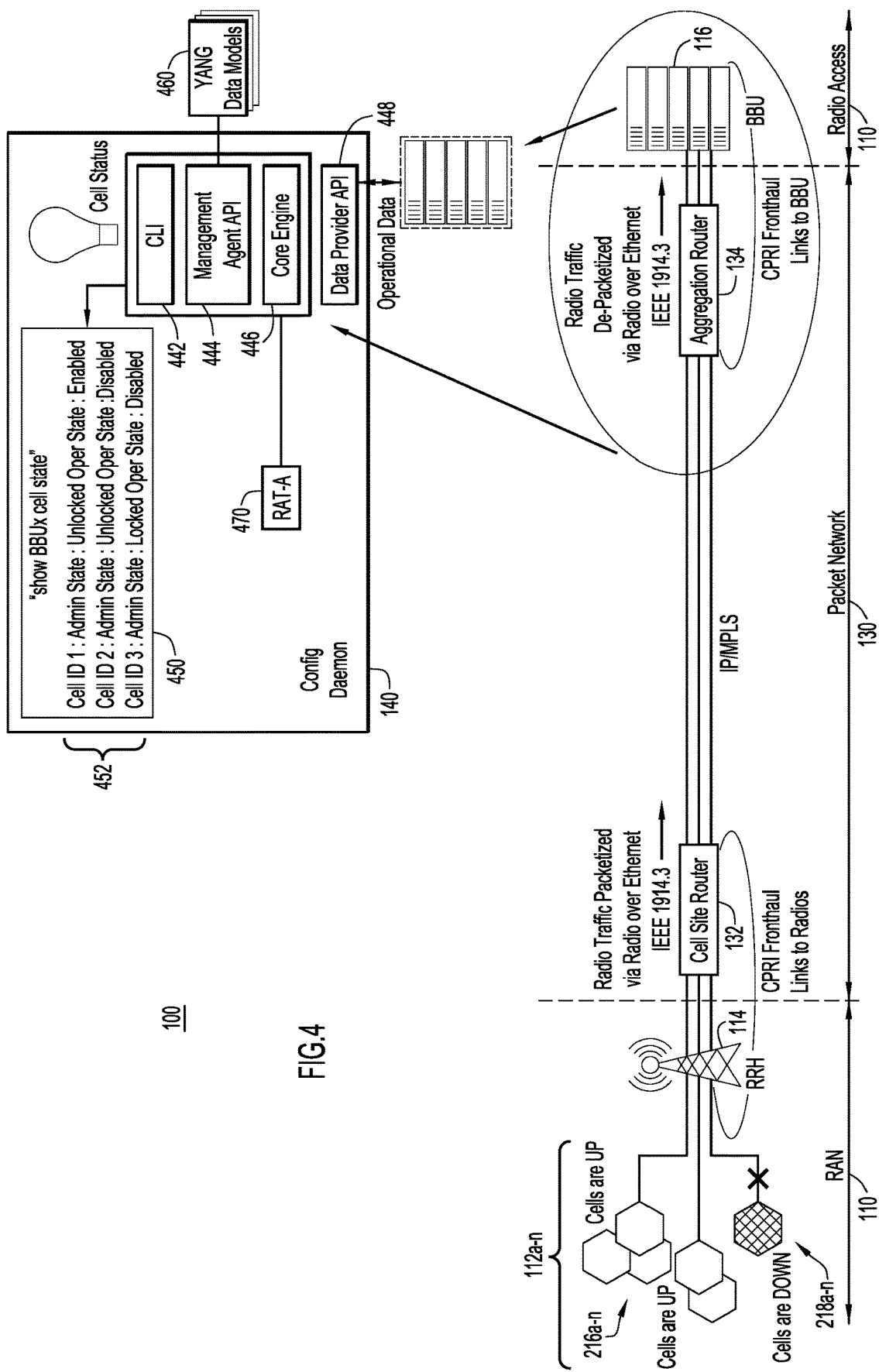
FIG. 4 is a block diagram of the system depicted in FIG. 1 additionally illustrating various components of one or more applications that interface with the radio controller for obtaining status of the one or more radio cells, according to one example embodiment.

FIG. 4 is a block diagram of the system 100 and further illustrating various components of the Config Daemon 140, according to an example embodiment.

In the system 100, the Config Daemon 140 is an instance of one or more software applications hosted in a container at the aggregation router 134, according to an example embodiment. The Config Daemon 140 includes logic to obtain, from the BBU node 116, radio cell status information and other operation data of the RAN 110. In various example embodiments, operational data may further include inquiries about sectors, downlink bandwidth, uplink bandwidth, cell quality, MIMO configuration, and many other radio parameters. The Config Daemon 140 is a data-model driven management plane framework, which provides a variety of standards-based northbound management interfaces for use in building network elements such as physical and virtual network devices (virtual network functions). The Config Daemon 140 exposes operational status information available at the BBU node 116 to the aggregation router 134 i.e., by checking cell health and status available at the BBU node 116 from the aggregation router 134 of the packet network 130.

Specifically, the Config Daemon 140 includes a command line interface (CLI) 442, a management agent application programming interface (API) 444, a core engine 446, a data provider API 448, and a RAT-A 470.

The CLI 442 is configured to receive a command, from an operator, to obtain cell state information of the RAN 110 e.g., "show BBUx cell state" 450. The management agent API 444 exposes a well-defined, multivendor, or vendor agnostic API toward the CLI 442 for BBU parameters. In other words, the management agent API 444 is a northbound API that standardizes queries (commands) and responses (command outputs). It defines vendor agnostic structures using YANG data models 460. This is just one example. The management agent API 444 may further include northbound interfaces such as NETCONF GET, Simple Network Management Protocol (SNMP), and so on.

The core engine 446 receives the vendor agnostic command. Then, the core engine 446 analyzes the command to identify BBU nodes for querying (e.g., the BBU node 116). Since the BBU nodes are RAN vendor specific nodes, for each BBU node, the core engine 446 determines its type. Based on the determined type, the core engine 446 parses the query into a vendor specific query for each of the BBU nodes to be queried. The parsed query is then provided via a respective data provider API (e.g., the data provider API 448) to the BBU nodes. The data provider API 448 provides the query to the BBU node 116. The data provider API 448 is the southbound API that may be vendor specific.

The operational data received from the BBU node 116 via the data provider API 448 is then parsed by the core engine 446. The core engine 446 determines cell state (and/or other parameters of the RAN 110) based on the operational data. The core engine 446 provides the determined cell state to the management agent API 444, which then parses it into a vendor agnostic response using the YANG data models 460. The response 452 (command output) is output on the CLI 442 for example, for the operator of the packet network 130.

The response 452 may include a cell identifier (ID), an administrative state, and an operational state for each of the radio cells 112a-n or a portion thereof (depending on the query). For example, the CLI 442 outputs "cell ID 1: Admin State: Unlocked, Oper State: Enabled" for one or more of the cells 216a-n and/or "cell ID 2: Admin State: Unlocked, Oper State: Disabled" for one or more of the cells 218a-n. If a radio cell is being accessed by an administrator (for configuring, maintenance, and so on), the response 452 includes "cell ID 3: Admin State: Locked, Oper State: Disabled". The response 452 is only one example.

In case a radio cell is detected to be unlocked and disabled, a radio access troubleshooting analyzer (RAT-A) 470 may be instantiated. The RAT-A 470 is a radio-aware transport analyzer can be instantiated to address the problem, as detailed below in FIG. 5.

Figure 5:
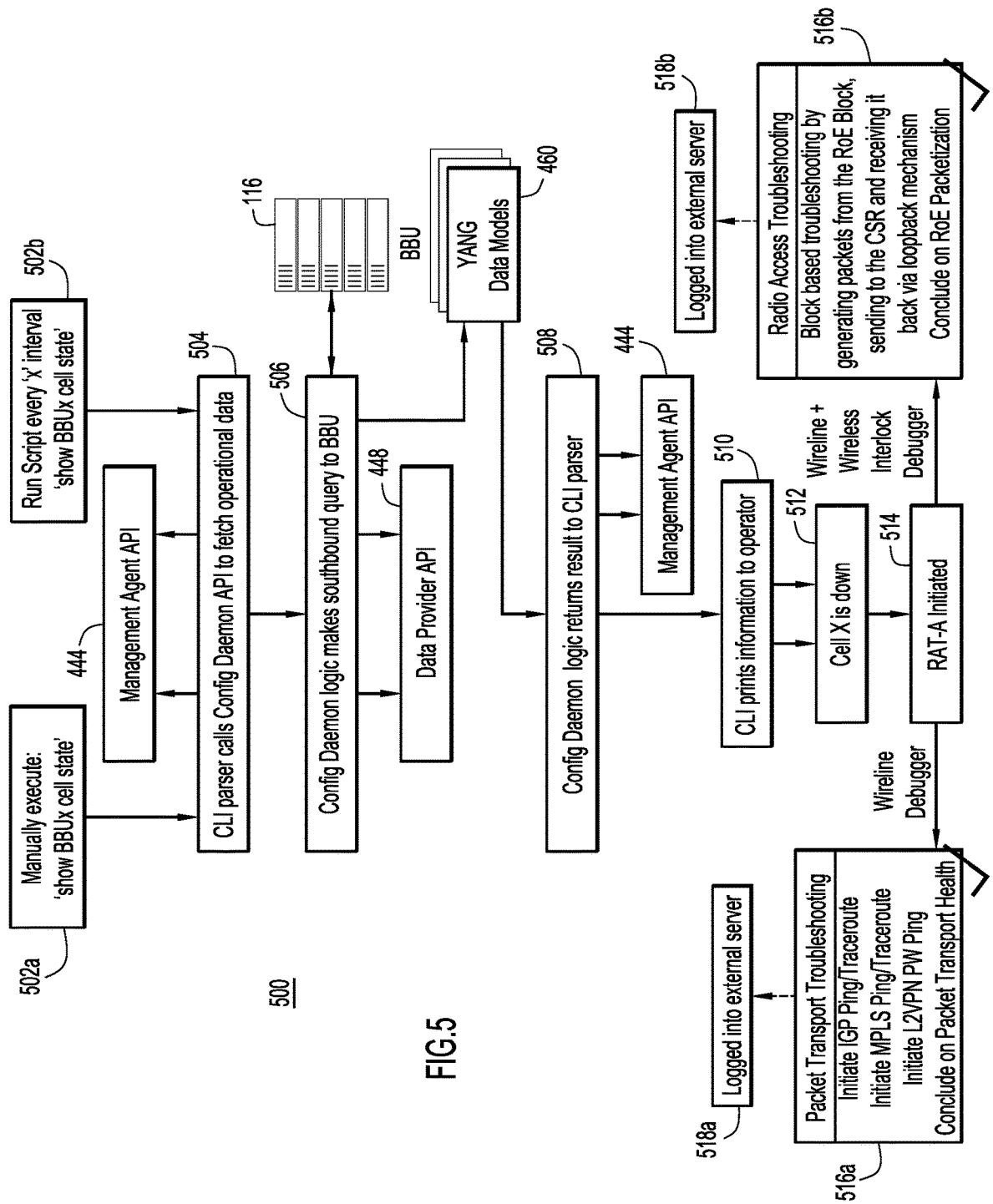
FIG. 5 is a flow diagram illustrating a method, performed by one or more applications hosted at a network device such as a cell aggregation router, for obtaining radio cell status information and diagnosing a problem in a radio access network with a packet-based fronthaul, according to one example embodiment.

With reference now to FIG. 5, together with FIG. 4, a method 500 for obtaining radio cell status information and diagnosing a problem in a radio access network with a packet-based fronthaul, is provided, according to one example embodiment. The method 500 is performed by the Config Daemon 140 hosted on the aggregation router 134. The Config Daemon 140 includes Config Daemon API, such as the management agent API 444, and Config Daemon logic, such as the core engine 446, and various data provider APIs (the data provider API 448). The method 500 further involves a CLI parser for the CLI 442 of FIG. 4.

At 502a, an operator may manually query a BBU (the BBU node 116) for operational data (status of one or more cells of the radio cells 112a-n). For example, the operator may execute "show BBUx cell state" at the CLI 442 as shown in FIG. 4. Alternatively or in addition, at 502b, the operator may run a script every x time interval (e.g., every 10 seconds). The script includes commands to query various BBUs (BBUx) to obtain the cell status of one or more cells in RAN 110 ("show BBUx cell state").

At 504, the CLI parser calls Config Daemon API to fetch operational data requested by the operator. The Config Daemon API obtains a RAN vendor agnostic command/query using the management agent API 444. The vendor agnostic command query needs to be specific to a radio vendor and is converted into a vendor specific query using the data provider API 448. The data provider API 448 parses the command (calls) to determine operational data of the BBUx to request.

At 506, the Config Daemon logic parses the command into a vendor specific query and makes a southbound query to the BBU 116 of FIGS. 1-4. The query logic is vendor dependent and varies among various RAN vendors. The results (response) obtained from the BBU 116 are then analyzed by the Config Daemon logic and parsed into one or more defined structures using YANG data models 460.

At 508, the Config Daemon logic returns the parsed data (analyzed and converted into the vendor agnostic structure by the management agent API 444) to the CLI parser.

At 510, the CLI parser outputs results for the operator on the CLI 442 (prints information to the operator). The output results may indicate that the radio cell status is "unlocked and enabled" e.g., cells 216*a-n* or "unlocked and disabled" e.g., cells 218*a-n*.

At 512, Config Daemon logic detects that one or more of the radio cells are down and initiates troubleshooting to detect the cause of the problem. In particular, at 514, the RAT-A 470 is initialized to detect and/or fix the problem. In one example embodiment, the RAT-A 470 performs both wireline and wireless troubleshooting (wireline and wireless interlock debugger).

At 516*a*, the wireline troubleshooting is performed, which involves detecting problems with the packet network 130. By way of an example, this may include initiating an Interior Gateway Protocol (IGP) ping and traceroute, a Multiprotocol Label Switching (MPLS) ping and traceout, and/or a Layer 2 (L2) Virtual Private Network (VPN) pseudo wire (PW) ping. Based on the above, the RAT-A 470 determines the state of the packet network 130. At 518*a*, the results of the troubleshooting are stored or logged to an external server for further analysis and statistics.

At 516*b*, wireline and wireless interlock troubleshooting is performed, which may involve detecting a problem with the RoE packetization. In particular, block-based troubleshooting is performed by generating packets from the RoE block and sending them to one or more routers, such as the cell site router (CSR) 132. The packets are then received via a loopback mechanism. Based on this loopback mechanism, the RAT-A 470 may determine the state of RoE packetization. At 518*b*, the results of the troubleshooting are stored or logged into an external server for further analysis and statistics.

The techniques presented above provide an interlock between the RAN 110 and the packet network 130 such that the packet transport is aware of RAN issues or problems. There is no need for a RAN team support to provide cell status to the packet network support, thereby reducing "Time to Act" and improving service-level agreements (SLAs) between RAN vendors and service providers. The techniques presented above provide OAMPT capabilities in a packet fronthaul network (integrated wireless and wireline). In one example embodiment, these techniques are implemented on top of an Open RAN (O-RAN) architecture, with an O-RU and an open distributed unit (O-DU), and thus are optionally O-RAN compliant.

The techniques presented above further provide a radio aware transport analyzer to detect problems in packet transport and RoE transport. Specifically, in an event of a cell outage, the RAT-A 470 is initiated to auto-debug the transport (RoE and CPRI) and detect cell flaps. Cell and packet transport states are logged (with time stamps) at one or more external servers. Thus, RAT-A 470 isolates the network problem and confirms whether the problem is with packetized fronthaul (RoE and CPRI) when a cell goes down.

Figure 6:
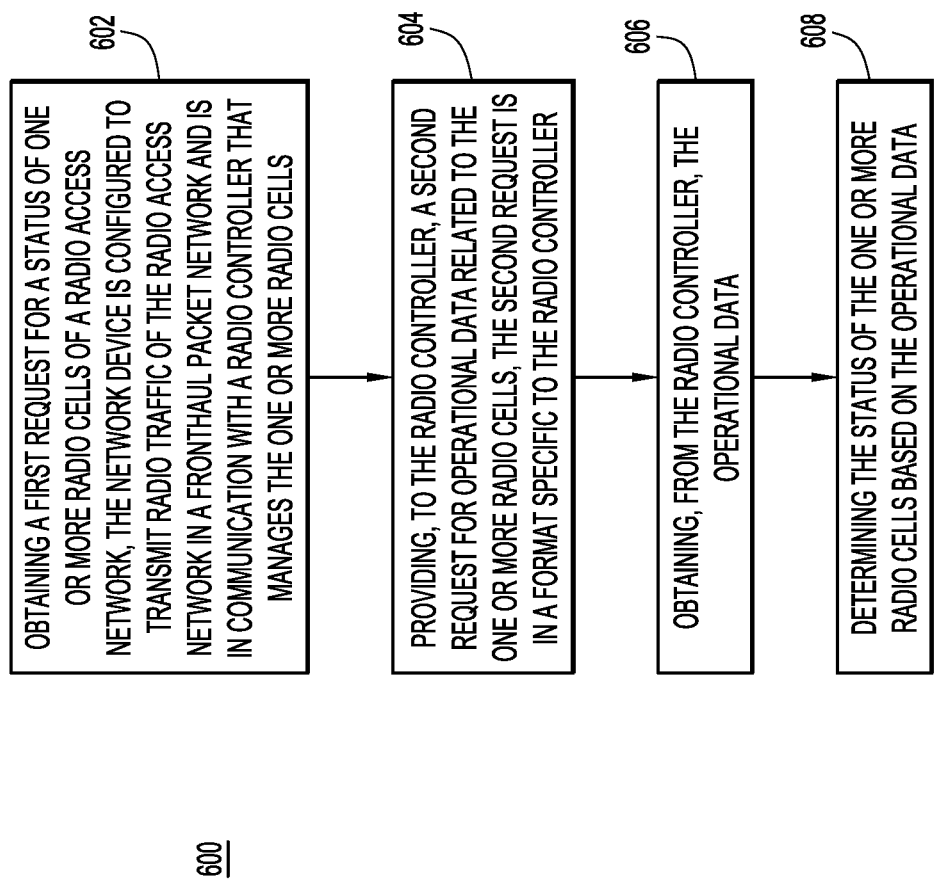
FIG. 6 is a flow chart depicting a method, performed by a network device, for obtaining status of one or more radio network cells, according to an example embodiment.

FIG. 6 is a flow chart showing a method 600 for obtaining status of one or more radio network cells, according to an example embodiment. The method 600 is performed by a network device such as the aggregation router 134 of FIGS. 1-5. More specifically, the method is performed by one or more applications, hosted at the aggregation router 134, such as the Config Daemon 140 of FIGS. 1-5.

At 602, the method 600 involves the network device obtaining a first request for a status of one or more radio cells of a radio access network. The network device is configured to transmit radio traffic of the radio access network in a fronthaul packet network. The network device is in communication with a radio controller that manages the one or more radio cells.

At 604, the method 600 involves the network device providing, to the radio controller, a second request for operational data related to the one or more radio cells. The second request is in a format specific to the radio controller.

At 606, the method 600 involves the network device obtaining, from the radio controller, the operational data.

At 608, the method involves the network device determining the status of the one or more radio cells based on the operational data.

According to one or more example embodiments, the method 600 may further involve the network device generating one or more test packets based on determining that the one or more radio cells are in a non-operational state, and determining health of the radio access network over the fronthaul packet network based on the one or more test packets.

In one form, the operation 604 of providing the second request and the operation 606 of obtaining the operational data are repeatedly performed at a predetermined time interval. The method 600 may further involve the network device storing, in a memory, state of the one or more radio cells to detect one or more cell flaps.

In one instance, the fronthaul packet network is an Internet Protocol/Multiprotocol label switching (IP/MPLS) network. In this instance, the method 600 may further involve providing an application programming interface that is configured to communicate with the radio controller to obtain the operational data.

According to one or more example embodiments, the operation 608 of determining the status of the one or more radio cells may include parsing the operational data into a defined structure using one or more data models and generating the status of the one or more radio cells in the defined structure. The defined structure may be a vendor agnostic structure.

In another form, the method 600 may further involve the network device providing the status of the one or more radio cells on a command line interface that is in communication with the network device.

In the method 600, the radio access network may be an open radio access network and the radio controller may be is a distributed unit. The operation 606 of obtaining the operational data may further include obtaining one or more of downlink and uplink bandwidth of the radio access network, cell quality information, or MIMO configuration parameters.

According to one or more example embodiment, in the method 600, the radio traffic may be communicated from a remote radio head, to the radio controller, via the network device of the fronthaul packet network. The network device may communicate with the radio controller via a common public radio interface.

Figure 7:
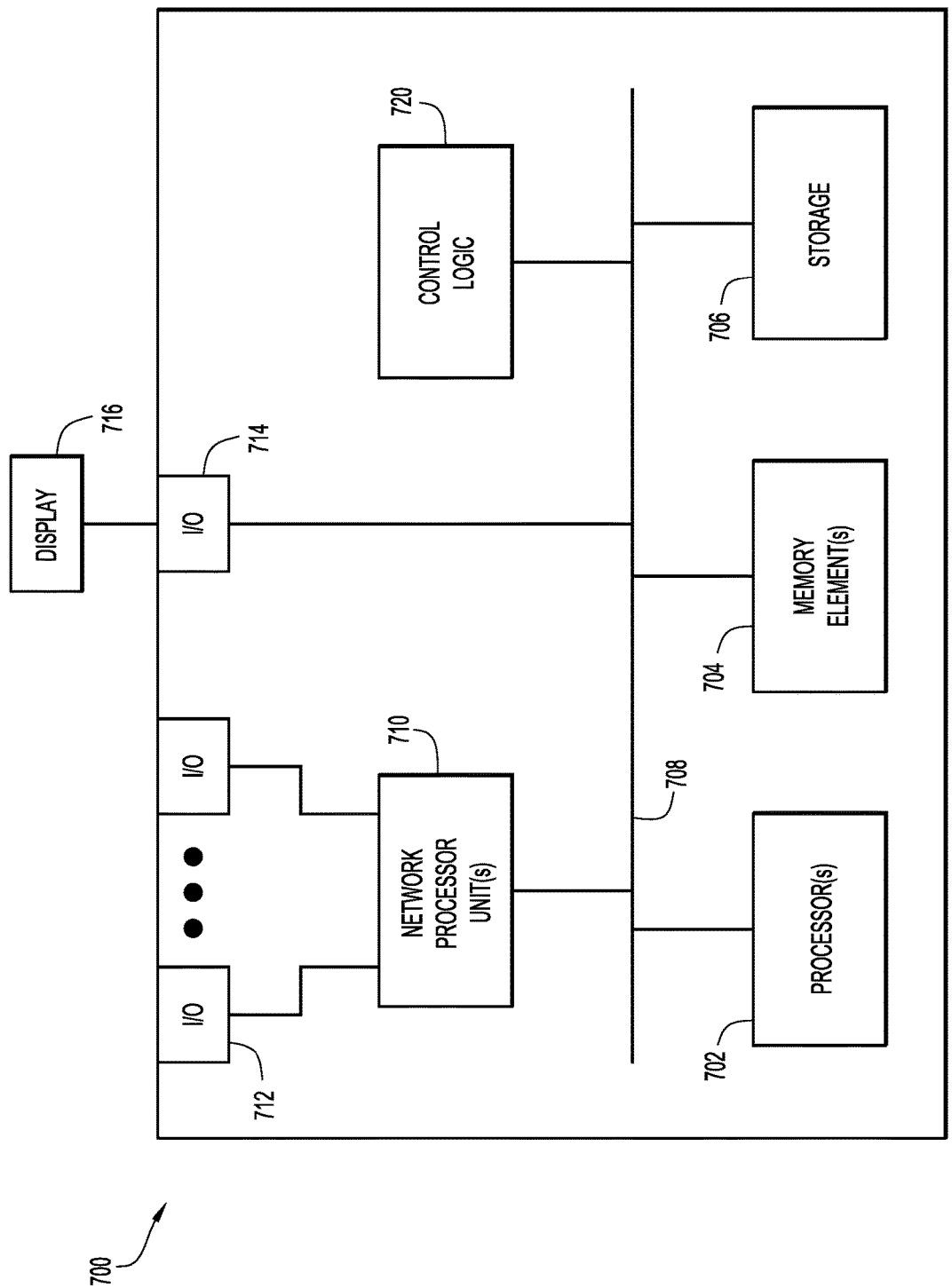
FIG. 7 is a hardware block diagram of a computing device that may perform one or more techniques depicted in FIGS. 1-6.

FIG. 7 is a hardware block diagram of a computing device 700 that may perform functions associated with any combination of operations in connection with the techniques depicted in FIGS. 1-6, according to various example embodiments, including, but not limited to, operations of the aggregation router 134 that hosts the Config Daemon 140 or the radio controller such as the BBU node 116, of FIGS. 1-6. Further, the computing device 700 may be representative of a radio network device such as the remote radio head node 114 of FIGS. 1-4. It should be appreciated that FIG. 7 provides only an illustration of one embodiment and does not imply any limitations with regard to the environments in which different embodiments may be implemented. Many modifications to the depicted environment may be made.

In at least one embodiment, computing device 700 may include one or more processor(s) 702, one or more memory element(s) 704, storage 706, a bus 708, one or more network processor unit(s) 710 interconnected with one or more network input/output (I/O) interface(s) 712, one or more I/O interface(s) 714, and control logic 720. In various embodiments, instructions associated with logic for computing device 700 can overlap in any manner and are not limited to the specific allocation of instructions and/or operations described herein.

In at least one embodiment, processor(s) 702 is/are at least one hardware processor configured to execute various tasks, operations and/or functions for computing device 700 as described herein according to software and/or instructions configured for computing device 700. Processor(s) 702 (e.g., a hardware processor) can execute any type of instructions associated with data to achieve the operations detailed herein. In one example, processor(s) 702 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, one or more memory element(s) 704 and/or storage 706 is/are configured to store data, information, software, and/or instructions associated with computing device 700, and/or logic configured for memory element(s) 704 and/or storage 706. For example, any logic described herein (e.g., control logic 720) can, in various embodiments, be stored for computing device 700 using any combination of memory element(s) 704 and/or storage 706. Note that in some embodiments, storage 706 can be consolidated with one or more memory elements 704 (or vice versa), or can overlap/exist in any other suitable manner.

In at least one embodiment, bus 708 can be configured as an interface that enables one or more elements of computing device 700 to communicate in order to exchange information and/or data. Bus 708 can be implemented with any architecture designed for passing control, data and/or information between processors, memory elements/storage, peripheral devices, and/or any other hardware and/or software components that may be configured for computing device 700. In at least one embodiment, bus 708 may be implemented as a fast kernel-hosted interconnect, potentially using shared memory between processes (e.g., logic), which can enable efficient communication paths between the processes.

In various embodiments, network processor unit(s) 710 may enable communication between computing device 700 and other systems, entities, etc., via network I/O interface(s) 712 to facilitate operations discussed for various embodiments described herein. In various embodiments, network processor unit(s) 710 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 700 and other systems, entities, etc. to facilitate operations for various embodiments described herein. In various embodiments, network I/O interface(s) 712 can be configured as one or more Ethernet port(s), Fibre Channel ports, and/or any other I/O port(s) now known or hereafter developed. Thus, the network processor unit(s) 710 and/or network I/O interface(s) 712 may include suitable interfaces for receiving, transmitting, and/or otherwise communicating data and/or information in a network environment.

I/O interface(s) 714 allow for input and output of data and/or information with other entities that may be connected to computer device 700. For example, I/O interface(s) 714 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a display 716.

In various embodiments, control logic 720 can include instructions that, when executed, cause processor(s) 702 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

In one example embodiment, an apparatus is provided to perform the above-described functions of the aggregation router 134 of FIGS. 1-6. The apparatus includes a memory, a network interface configured to enable network communications and a processor. The processor is configured to perform various operations. The operations include obtaining a first request for a status of one or more radio cells of a radio access network. The apparatus is configured to transmit radio traffic of the radio access network in a fronthaul packet network and is in communication with a radio controller that manages the one or more radio cells. The operations further include providing, to the radio controller, a second request for operational data related to the one or more radio cells. The second request is in a format specific to the radio controller. The operations further include obtaining, from the radio controller, the operational data and determining the status of the one or more radio cells based on the operational data.

In one instance, the apparatus is an aggregation router of the fronthaul packet network.

According to one or more example embodiments, the processor may further be configured to perform additional operations of generating one or more test packets based on determining that the one or more radio cells are in a non-operational status and determining health of the radio access network over the fronthaul packet network based on the one or more test packets.

In one form, the processor may be configured to repeatedly perform the operations of providing the second request and obtaining the operational data, at a predetermined time interval. The processor may further be configured to perform an additional operation of storing, in a memory, state of the one or more radio cells to detect one or more cell flaps.

In another form, the fronthaul packet network may be an Internet Protocol/Multiprotocol label switching (IP/MPLS) network. The processor may further be configured to perform an operation of providing an application programming interface that is configured to communicate with the radio controller to obtain the operational data.

According to one or more example embodiments, the processor may further be configured to perform the operation of providing the status of the one or more radio cells on a command line interface that is in communication with the apparatus.

In yet another form, the radio access network may be an open radio access network and the radio controller may be a distributed unit. The processor may be configured to perform the operation of obtaining the operational data by obtaining one or more of downlink and uplink bandwidth of the radio access network, cell quality information, or MIMO configuration parameters.

In yet another example embodiment, one or more non-transitory computer readable storage media encoded with instructions are provided. When the media is executed by a processor, the instructions cause the processor to execute a method involving obtaining a first request for a status of one or more radio cells of a radio access network. The processor is configured to transmit radio traffic of the radio access network in a fronthaul packet network and is further configured to communication with a radio controller that manages the one or more radio cells. The method further involves providing, to the radio controller, a second request for operational data related to the one or more radio cells. The second request is in a format specific to the radio controller. The method further involves obtaining, from the radio controller, the operational data and determining the status of the one or more radio cells based on the operational data.

In yet another example embodiment, a system is provided that includes the devices and operations explained above with reference to FIGS. 1-7.

The programs described herein (e.g., control logic 720) may be identified based upon the application(s) for which they are implemented in a specific embodiment. One example of the control logic 720 is the Config Daemon 140 of FIGS. 1-6. However, it should be appreciated that any particular program nomenclature herein is used merely for convenience, and thus the embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, the storage 706 and/or memory elements(s) 704 can store data, software, code, instructions (e.g., processor instructions), logic, parameters, combinations thereof, and/or the like used for operations described herein. This includes the storage 706 and/or memory elements(s) 704 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein, the terms may be used in a generic sense to include packets, frames, segments, datagrams, and/or any other generic units that may be used to transmit communications in a network environment. Generally, the terms reference to a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
obtaining, by a network device, a first request for a status of one or more radio cells of a radio access network, wherein the network device is configured to transmit radio traffic of the radio access network in a fronthaul packet network and is in communication with a radio controller that manages the one or more radio cells;
providing, by the network device to the radio controller, a second request for operational data related to the one or more radio cells, wherein the second request is in a format specific to the radio controller;
obtaining, by the network device from the radio controller, the operational data; and
determining, by the network device, the status of the one or more radio cells based on the operational data,
wherein the radio traffic is communicated from a remote radio to the radio controller via the network device of the fronthaul packet network and wherein the network device communicates with the radio controller via a common public radio interface.

2. The method of claim 1, further comprising:
generating, by the network device, one or more test packets based on determining that the one or more radio cells are in a non-operational status; and
determining, by the network device, health of the radio access network over the fronthaul packet network based on the one or more test packets.

3. The method of claim 1, wherein providing the second request and obtaining the operational data are repeatedly performed at a predetermined time interval and further comprising:
storing in a memory, by the network device, state of the one or more radio cells to detect one or more cell flaps.

4. The method of claim 1, wherein the fronthaul packet network is an Internet Protocol/Multiprotocol label switching (IP/MPLS) network, and further comprising:
providing an application programming interface that is configured to communicate with the radio controller to obtain the operational data.

5. The method of claim 1, wherein determining the status of the one or more radio cells comprises:
parsing the operational data into a defined structure using one or more data models; and
generating the status of the one or more radio cells in the defined structure, wherein the defined structure is a vendor agnostic structure.

6. The method of claim 5, further comprising:
providing, by the network device, the status of the one or more radio cells on a command line interface that is in communication with the network device.

7. The method of claim 1, wherein the radio access network is an open radio access network and the radio controller is a distributed unit, and obtaining the operational data further comprises:
obtaining one or more of downlink and uplink bandwidth of the radio access network, cell quality information, or multiple-input multiple-output (MIMO) configuration parameters.

8. An apparatus comprising:
a memory;
a network interface configured to enable network communications; and
a processor, wherein the processor is configured to perform operations comprising:
obtaining a first request for a status of one or more radio cells of a radio access network, wherein the apparatus is configured to transmit radio traffic of the radio access network in a fronthaul packet network and is in communication with a radio controller that manages the one or more radio cells;
providing, to the radio controller, a second request for operational data related to the one or more radio cells, wherein the second request is in a format specific to the radio controller;
obtaining, from the radio controller, the operational data; and
determining the status of the one or more radio cells based on the operational data, wherein the radio traffic is communicated from a remote radio head to the radio controller via the radio controller via a common public radio interface.

9. The apparatus of claim 8, wherein the apparatus is an aggregation router of the fronthaul packet network.

10. The apparatus of claim 8, wherein the processor is further configured to perform:
generating one or more test packets based on determining that the one or more radio cells are in a non-operational status; and
determining health of the radio access network over the fronthaul packet network based on the one or more test packets.

11. The apparatus of claim 8, wherein the processor is configured to repeatedly perform the operations of providing the second request and obtaining the operational data, at a predetermined time interval and the processor is further configured to perform:
storing, in the memory, state of the one or more radio cells to detect one or more cell flaps.

12. The apparatus of claim 8, wherein the fronthaul packet network is an Internet Protocol/Multiprotocol label switching (IP/MPLS) network and the processor is further configured to perform:
providing an application programming interface that is configured to communicate with the radio controller to obtain the operational data.

13. The apparatus of claim 12, wherein the processor is further configured to perform:
providing the status of the one or more radio cells on a command line interface that is in communication with the apparatus.

14. The apparatus of claim 8, wherein the radio access network is an open radio access network and the radio controller is a distributed unit, and the processor is configured to perform the operation of obtaining the operational data by obtaining one or more of downlink and uplink bandwidth of the radio access network, cell quality information, or multiple-input multiple-output (MIMO) configuration parameters.

15. The apparatus of claim 8, wherein the processor is configured to determine the status of the one or more radio cells by:
parsing the operational data into a defined structure using one or more data models; and
generating the status of the one or more radio cells in the defined structure, wherein the defined structure is a vendor agnostic structure.

16. One or more non-transitory computer readable storage media encoded with instructions that, when executed by a processor, cause the processor to execute a method comprising:
obtaining a first request for a status of one or more radio cells of a radio access network, wherein the processor is configured to transmit radio traffic of the radio access network in a fronthaul packet network and is further configured to communication with a radio controller that manages the one or more radio cells;
providing, to the radio controller, a second request for operational data related to the one or more radio cells, wherein the second request is in a format specific to the radio controller;
obtaining, from the radio controller, the operational data; and
determining the status of the one or more radio cells based on the operational data, wherein the radio traffic is communicated from a remote radio head to the radio controller via the processor and wherein the processor is configured to communicate with the radio controller via a common public radio interface.

17. The one or more non-transitory computer readable storage media of claim 16, wherein the method further comprises:

generating one or more test packets based on determining that the one or more radio cells are in a non-operational status; and determining health of the radio access network over the fronthaul packet network based on the one or more test packets.

18. The one or more non-transitory computer readable storage media of claim 16, wherein providing the second request and obtaining the operational data are repeatedly performed at a predetermined time interval and the method further comprises:

storing, in a memory, state of the one or more radio cells to detect one or more cell flaps.

19. The one or more non-transitory computer readable storage media of claim 16, wherein the fronthaul packet network is an Internet Protocol/Multiprotocol label switching (IP/MPLS) network, and the method further comprises:

providing an application programming interface that is configured to communicate with the radio controller to obtain the operational data.

20. The one or more non-transitory computer readable storage media of claim 16, wherein determining the status of the one or more radio cells includes:

parsing the operational data into a defined structure using one or more data models; and generating the status of the one or more radio cells in the defined structure, wherein the defined structure is a vendor agnostic structure.

\* \* \* \* \*

UNITED STATES PATENT AND TRADEMARK OFFICE
CERTIFICATE OF CORRECTION

| | |
|---|---|
| PATENT NO. | : 11,576,063 B2 |
| APPLICATION NO. | : 17/240261 |
| DATED | : February 7, 2023 |
| INVENTOR(S) | : Sounak Mukherjee et al. |

It is certified that error appears in the above-identified patent and that said Letters Patent is hereby corrected as shown below:

In the Claims

Claim 1, Column 14, Line 64, please replace "radio to the radio controller" with --radio head to the radio controller--

Claim 8, Column 15, Lines 62-63, please replace "via the radio controller via a common public radio interface." with --via the apparatus of the fronthaul packet network and wherein the apparatus communicates with the radio controller via a common public radio interface.--

Signed and Sealed this
Fourteenth Day of March, 2023

Katherine Kelly Vidal
*Director of the United States Patent and Trademark Office*